United States Patent [19]

Ohlson et al.

[11] 4,122,454
[45] Oct. 24, 1978

[54] CONICAL SCAN TRACKING SYSTEM EMPLOYING A LARGE ANTENNA

[76] Inventors: Robert A. Frosch, Administrator of the National Aeronautics and Space Administration, with respect to an invention of John E. Ohlson, Marina; MacGregor S. Reid, La Canada, both of Calif.

[21] Appl. No.: 818,917
[22] Filed: Jul. 25, 1977
[51] Int. Cl.² ............................ G01S 3/42; G01S 3/56
[52] U.S. Cl. ................................. 343/117 R; 343/7.4; 343/118
[58] Field of Search ........... 343/118, 117 R, 100 ME, 343/7.4

[56] References Cited

U.S. PATENT DOCUMENTS

| 3,842,420 | 10/1974 | Rabow | 343/117 R |
| 3,859,658 | 1/1975 | Rabow | 343/7.4 |
| 3,886,555 | 5/1975 | Royal | 343/118 X |
| 3,924,235 | 12/1975 | Heller et al. | 343/7.4 |

Primary Examiner—T.H. Tubbesing
Assistant Examiner—Richard E. Berger
Attorney, Agent, or Firm—Monte F. Mott; John R. Manning; Paul F. McCaul

[57] ABSTRACT

A conical scan tracking system for spacecraft and radio sources employing a large antenna detects small sinusoidal modulation in received power from a source that is off target with a frequency equal to a very low scan rate, an amplitude proportional to angular deviation of the source from the target, and a phase directly related to the direction the source is off target. The sinusoid is digitally correlated with inphase and out-of-phase (90°) scan sinusoids to obtain azimuth/elevation and hour angle/declination signals which are digitally integrated over exactly one scan period (e.g., 10 to 100 sec) to obtain correction signals for an antenna pointing subsystem.

10 Claims, 5 Drawing Figures

CONICAL SCAN TRACKING SYSTEM EMPLOYING A LARGE ANTENNA

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a conical scan tracking system for spacecraft and other radio sources employing a large antenna.

To actively track spacecraft and distant radio sources, it is necessary to utilize a large antenna, such as the 64-meter paraboloid antenna at Goldstone, California. A conical scan tracking system probably has the most accuracy because it continuously provides correction signals without requiring degradation of system noise temperature as caused by a monopulse feed system. A single antenna is mechanically rotated in a conical pattern at a rate $f_s$ about a pointing axis of the tracking system. If the target remains on the axis, the target signal is constant. If the target is displaced, the target signal is modulated sinusoidally with one cycle for each scan cycle. The amplitude of modulation indicates the extent of target displacement, and the phase of the modulation indicates the direction of displacement.

For small excursions from the axis, the modulation will be linear and expressed by the relationship $$A(t) = A_o[1 = k_s \epsilon \cos(\omega_s t - \phi)] \quad (1)$$

where $A(t)$ is the amplitude received at time $t$, $A_o$ is the amplitude averaged over the scan cycle, $k_s$ is the "error slope" of the system, $\epsilon$ is the magnitude of the error, $\phi$ is the phase angle of the error, and $\omega_s = 2\pi f_s$. If $t$ is taken as zero when the scan is at the point to the right of the axis, proceeding counterclockwise, then it follows that $$A(t) = A_o(1 + k_s \epsilon_x \cos\omega_s t + k_s \epsilon_y \sin\omega_s t) \quad (2)$$

where $\epsilon_x$ is the component of error to the right and $\epsilon_y$ is the upward component. The two error components produce independent modulation components in quadrature with each other which may be separated.

The two error components may be separated after error signal detection by use of a suitable phase-sensitive error demodulator. The $\epsilon_x$ component becomes the input to an azimuth drive servo, while the $\epsilon_y$ becomes the input to an elevation drive servo. In order to hold the error slope $k_s$ constant at the servo input for various target sizes and ranges, an automatic gain control (AGC) loop is used in the receiver. The time constant of the AGC loop is generally much smaller than the scan period, so that the modulation at the scan frequency is not suppressed. Alternatively, a slow AGC may be used and the error modulation is extracted from the detected signal voltage itself.

An accuracy of 0.001° has been achieved in aircraft tracking systems using radar with a small antenna scanning at a relatively high rate of many cycles per second so that analog correlation suffices. An object of this invention is to achieve similar accuracies in a conical scan tracking system employing a large antenna, such as the 64-meter Goldstone antenna. However, because of the size of the antenna, it can be scanned only at very low rates. For a scan cycle period of ten to one hundred seconds, the "double frequency" terms arising in analog correlation would cause unwanted oscillation in the tracking system.

SUMMARY OF THE INVENTION

In accordance with the present invention, a conical-scan tracking system employing a large antenna is comprised of means for scanning the antenna in a conical pattern about a boresight (mechanical scan or pointing axis) at a low rate, e.g., scan rates of one cycle in 10 to 100 seconds, and means for receiving electromagnetic radiation from a source to provide a sinusoidal error signal of an amplitude proportional to the extent the source is displaced from the boresight, a frequency equal to the scan rate, and a phase with respect to the conical scan indicative of the direction of source displacement. Detection means couples the sinusoidal error signal to an analog-to-digital converter to provide the error modulation, $E_M$, of an off-axis source in digital form.

The error modulation signal in digital form is multiplied by an in-phase scan reference signal $R\sin\omega_m t$ in digital form and separately by an out-of-phase scan reference signal $R\cos\omega_m t$ in digital form, where R is the scan radius in radians. The products $E_M R\sin\omega_m t$ and $E_M R\cos\omega_m t$ are separately integrated for exactly one scan period to provide respective azimuth/elevation and hour angle/declination error correction signals to an antenna pointing subsystem during the next scan cycle.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
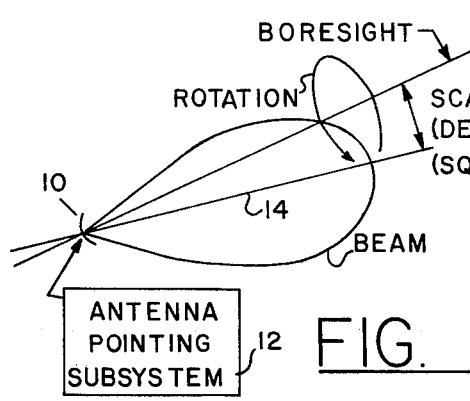
FIG. 1 is a diagram illustrating the antenna scan geometry as viewed from one side.
Figure 2:
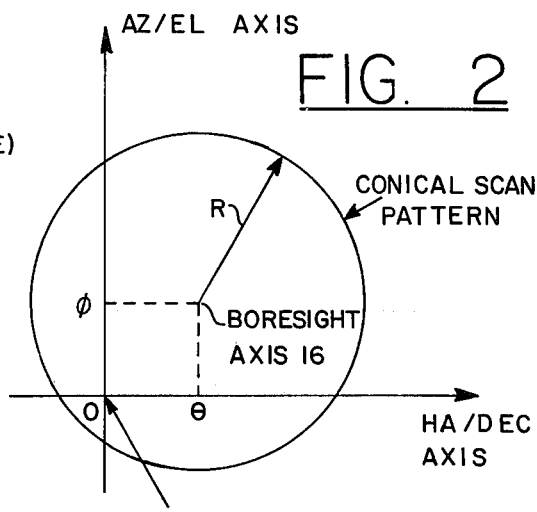
FIG. 2 is a diagram illustrating the antenna scan geometry as viewed down the mechanical scan, or boresight, axis.

Referring now to FIG. 1, a large paraboloid antenna 10 is mechanically driven by an antenna pointing subsystem 12 (which includes a servomechanism) to rotate the beam axis 14 of the antenna about the boresight (pointing direction or mechanical scan axis) 16 to form a cone with a radius R in degrees. The antenna pointing subsystem detects any displacement of the axis 16 from the source (or target) and produces $\phi$ and $\theta$ error signals to drive the boresight onto the source such that the boresight is placed at the origin of mechanical azimuth/elevation and hour angle/declination. FIG. 2 illustrates the coordinates of the boresight for a significant pointing error. As illustrated, the boresight is $\theta$ radians away from the sources in the HA/DEC axis and $\phi$ radians away from the source in the AZ/EL axis. The objective is for the errors θ and φ to be reduced to zero.

Figure 3:
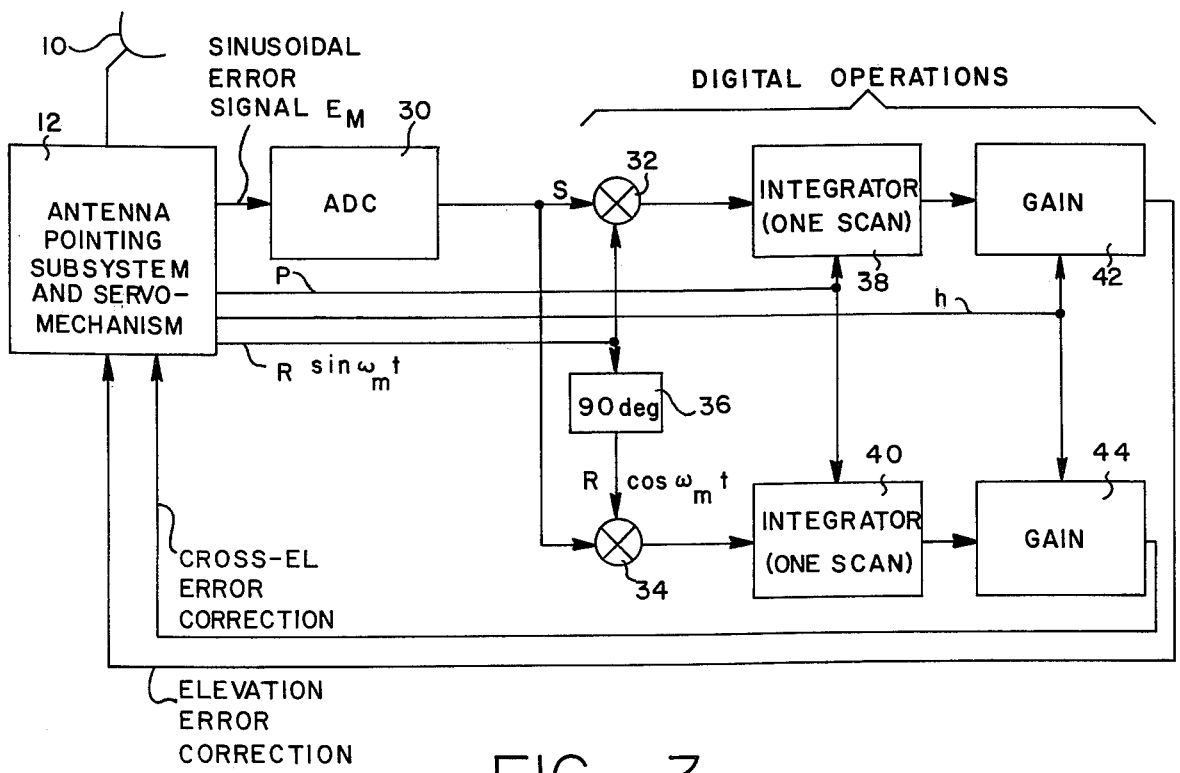
FIG. 3 is a functional block diagram of the present invention.

The antenna pointing subsystem includes a data processor which not only processes the elevation and cross-elevation signals to produce control signals to an antenna pointing servomechanism, but also includes digital means for developing the error signals as shown in FIG. 3. Pointing "predicts" are used to direct boresight very close to the source and then the conical-scan around the mechanical axis generates digital signals to correct for pointing errors. If a spacecraft or radio source is on the boresight or pointing axis, the received signal power in the antenna is constant with time. However, if the source is off axis a small sinusoidal variation in received power occurs. The frequency of the sinusoid is simply the scan rate. The sinusoid amplitude is proportional to angular displacement of the boresight from the source, and the phase of the sinusoid with respect to the scan rotation gives the direction of the error. Conical-scan schemes for radar tracking use sinusoid and cosinusoid signals referenced to an antenna pointing subsystem to do a correlation on the received error modulation signal, $E_M$, in order to derive error signals for the two orthogonal axes of the antenna pointing subsystem.

Radar tracking conventionally uses a relatively high scan rate of many cycles per second so that analog correlation suffices. However, for scan periods of 10 to 100 seconds, the "double frequency" terms arising in analog correlation would cause unwanted oscillation in the tracking system. Therefore, a scheme using integration over exacting one scan period, P, is employed in the digital operations shown in FIG. 3. The sinusoidal error signal from the antenna is derived from the output of a suitable radiometer when tracking a radio source, or a telemetry receiver when tracking a spacecraft. In the case of a radio source, careful attention must be paid to the time constant of the radiometer. In the case of tracking a spacecraft with a coherent down link carrier, the error signal will be the receiver AGC voltage.

Figure 4:
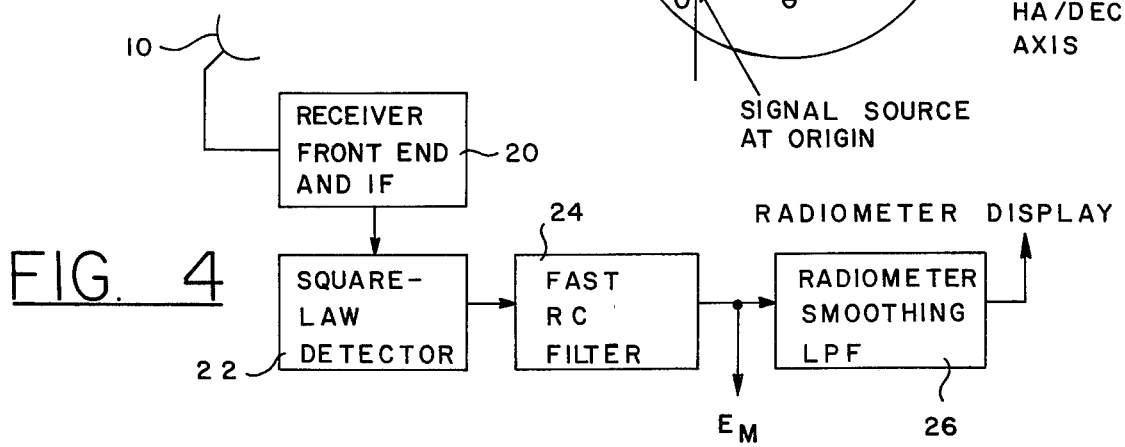
FIG. 4 is a block diagram illustrating a radiometer configuration.

A classical total-power radiometer for the conical-scan system is shown in FIG. 4. All RF and IF processing is included in the single front end block 20 for discussion purposes. Following that there is a conventional square law detector 22 and a fast RC filter 24. The signal $E_M$ to the conical-scan subsystem is taken from the fast RC filter. Also provided is a conventional smoothing filter 26 for radiometer smoothing.

The fast RC filter is chosen to have a time constant no more than 1/20 of the scan period so that little amplitude and phase degradation of the error signal sinusoid results. If the radiometer smoothing low-pass filter has a time constant satisfying this requirement, the signal $E_M$ can be taken at the normal radiometer output. However, if the radiometer smoothing time approaches the scan period, a fast RC filter must be used or severe degradation of performance will result because the sinusoidal error signal will be smoothed out. Similarly, the AGC time constant of the telemetry receiver must be no more than 1/20 of the scan period.

The output of the radiometer receiver of FIG. 4, or the AGC of a telemetry receiver, provides the sinusoidal error signal from which the orthogonal error correction signals are developed by digital operations shown in the functional blocks of FIG. 3. The first function is to convert the error signal to digital form in an analog-to-digital converter (ADC) 30 before the digital operations can take place. It is preferred to have the digital operations performed by a programmed digital computer. However, it should be understood that the digital operations could be carried out by hardware with hard-wired program sequences in an arrangement shown.

The ADC provides the error modulation, $E_M$, of an off-axis source in digital form. The error modulation is multiplied by an in-phase scan reference signal $R\sin\omega_m t$ in digital form in multiplier 32 and separately by an out-of-phase reference signal $R\cos\omega_m t$ in multiplier 34, where R is the scan radius in degrees as shown in FIG. 2. A 90° phase shifter 36 provides the out-of-phase reference signal from the in-phase reference signal.

The outputs of the multipliers are integrated for exactly one scan period by integrators 38 and 40 to provide respective elevation and cross-elevation error correction signals to the antenna pointing subsystem during the next scan cycle period, P, via gain multipliers 42 and 44 where a gain factor $h$ is applied from the antenna pointing subsystem. The magnitude of that factor is determined empirically.

The ADC has twelve conversion bits including sign, and samples ten times per second. With a 0.1 s time constant for the radiometer or AGC there is less than 4% decrease in signal-to-noise ratio due to finite sampling rate of the ADC. It is also desirable that quantization noise not be a limiting factor. Thus there must be enough gain prior to the ADC, and the ADC must have enough levels so that the voltages to the ADC randomly cross several levels due to noise alone. A 12-bit ADC was found to be adequate for a wide range of signal types. The conical-scan program is packed into approximately 2000 24-bit locations in core memory.

Figure 5:
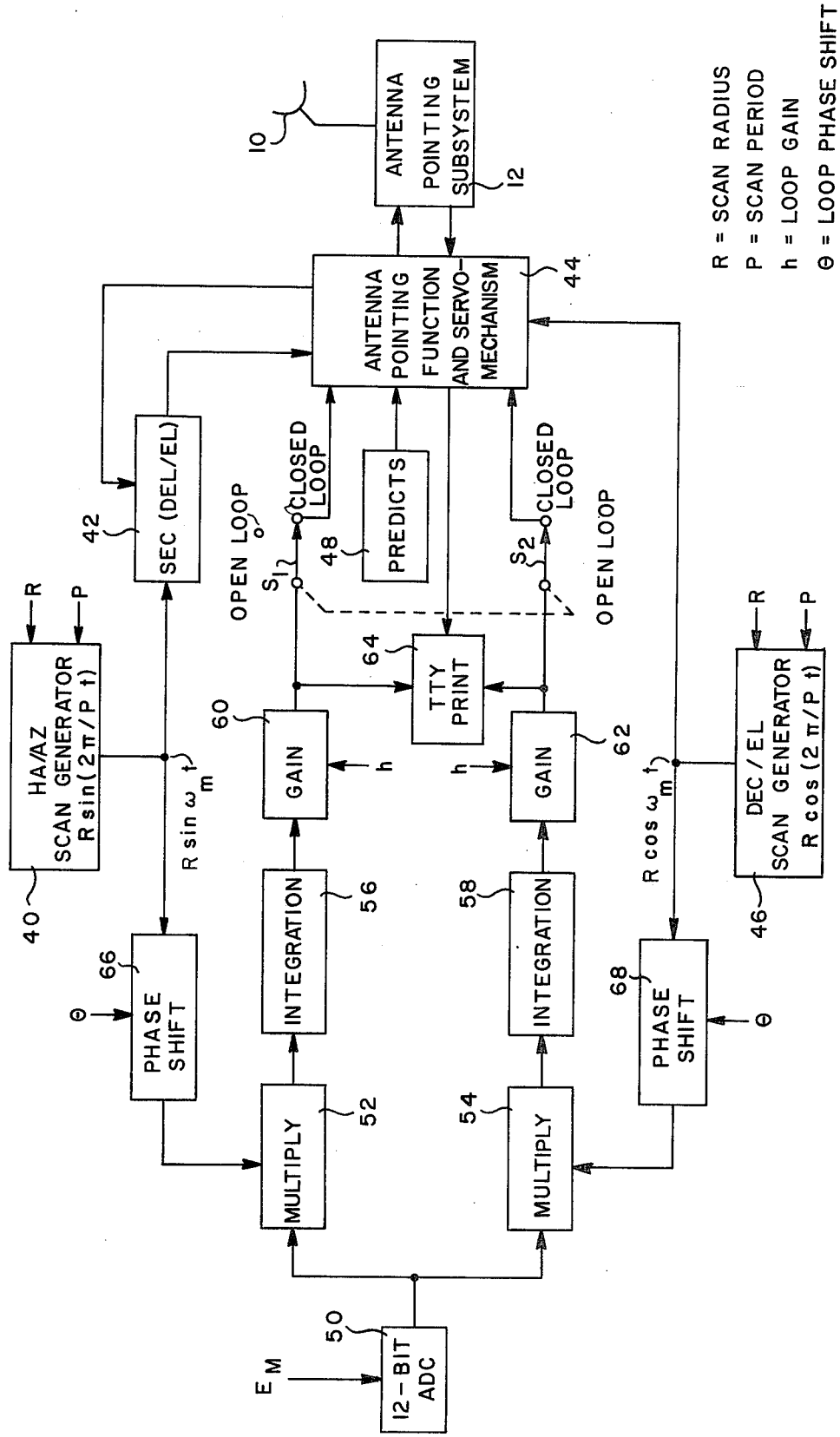
FIG. 5 illustrates a preferred embodiment of the invention.

A block diagram of a preferred embodiment is shown in FIG. 5. Although this preferred embodiment may be implemented with hardware, it would be more advantageous to implement it with software in a digital computer. Consequently, it will be described as a software implementation. Reference numerals apply to the various programmed functions indicated by a block.

The program is configured so it could do a conical scan in either hour angle/declination (HA/DEC) or azimuth/elevation (AZ/EL) coordinates. The appropriate secant (SEC) correction is required in either case so as to get a circular scan as seen as a projection on the celestial sphere. The operation is easy to follow. Consider an AZ/EL scan. The scan frequency in radians/second is $\omega_m = 2\pi/P$. The AZ scan $R\sin\omega_m t$ from generator 40 is corrected by the secant of EL in block 42 and is fed to the antenna pointing function 44 along with the EL scan $R\cos\omega_m t$ from generator 46 and computer predicts from block 48. This then results in a conical scan. A square-law detector, or an AGC voltage, feeds the ADC 50 which is then multiplied by in- and out-of-phase scan sinusoids in blocks 52 and 54, and is integrated (summed) for one scan in blocks 56 and 58. A gain $h$ is applied in blocks 60 and 62 and a printout occurs through a teletype 64. If the loop is closed by switches $S_1$ and $S_2$, an angular position correction is made and tracking commences. When the system is in closed loop operation, the teletype prints the accumulated total of corrections. A phase shift θ in blocks 66 and 68 is necessary due to phase lag in the physical antenna and the AGC loop or detector filter. The value of θ is determined so that the two channels decouple and operate independently.

It has been found that the primary source of phase lag is actually the antenna itself. A circular scan requires sinusoidal acceleration in each axis, and the antenna servo cannot achieve zero steady state position error. For a 58-second scan, $\theta$ needs to be about $-30°$ and for a 28-second scan has to be about $-15°$ in order to decouple the two axes. The value in degrees of the scan radius R is chosen so that the crossover loss is acceptable for the task at hand. For an experimental program, each scan had a 2-second halt to allow all calculations to be completed. It is not convenient to remove this halt, but little error is introduced because the antenna tends to coast through the halt.

Although particular embodiments of the invention have been described and illustrated herein, it is recognized that modifications and equivalents may readily occur to those skilled in the art and consequently it is intended that the claims be interpreted to cover such modifications and equivalents.

We claim:

1. In a conical scan system tracking spacecraft and radio sources, said system having a large antenna for detecting small sinusoidal signal modulation, $E_M$, in received power from a source that is off boresight axis with a frequency equal to a very low scan rate, an amplitude proportional to angular deviation of the source from the boresight axis, and a phase directly related to the direction the source is off the boresight axis, the combination comprising means for continually converting said signal modulations to digital form, a source of inphase reference scan sinusoidal values, means for digitally correlating said signal modulations in digital from with said inphase reference scan sinusoid values to obtain inphase correlation signals in digital form, a source of out-of-phase reference scan sinusoidal values 90° out of phase with said inphase reference scan sinusoidal values, means for digitally correlating said signal modulations in digital form with said out-of-phase reference scan sinusoidal values to obtain out-of-phase correlation signals in digital form, and means for separately integrating said inphase and out-of-phase correlation signals in digital form over exactly one scan period to obtain correlation signals for said antenna pointing subsystem.

2. The combination of claim 1 wherein said scan period is of the order of 10 to 100 seconds.

3. The combination of claim 2 wherein said means for digitally correlating said signal modulations in digital form with said inphase reference scan sinusoidal values is comprised of a digital multiplier, and said means for digitally correlating said signal modulations in digital from with said out-of-phase reference scan sinusoidal values is comprised of a digital multiplier.

4. The combination of claim 3 wherein said inphase and out-of-phase correlation signals in digital form are each multiplied by a gain factor, $h$, of a value determined empirically.

5. The combination of claim 4 wherein said inphase and out-of-phase reference scan sinusoidal values are each multiplied by a phase shift value, $\theta$, of a value empirically determined to compensate for phase lag in the antenna pointing subsystem such that the inphase and out-of-phase signal channels decouple and operate independently.

6. The combination of claim 1 wherein said inphase and out-of-phase reference scan sinusoidal values are each multiplied by a phase shift value, $\theta$, of a value empirically determined to compensate for phase lag in the antenna pointing subsystem such that the inphase and out-of-phase signal channels decouple and operate independently.

7. The combination of claim 6 wherein said inphase and out-of-phase correlation signals in digital form are each multiplied by a gain factor, $h$, of a value determined empirically.

8. The combination of claim 7 wherein said scan period is of the order of 10 to 100 seconds.

9. The combination of claim 8 wherein said means for digitally correlating said signal modulations in digital form with said inphase reference scan sinusoidal values is comprised of a digital multiplier, and said means for digitally correlating said signal modulations in digital form with said out-of-phase reference scan sinusoidal values is comprised of a digital multiplier.

10. The combination of claim 9 wherein said means for separately integrating said inphase and out-of-phase correlation signals in digital form over exactly one scan period to obtain correlation signals for said antenna pointing subsystem is comprised of means for separately summing said inphase and out-of-phase correlation signals in digital form.

* * * * *